United States Patent [19]

Hilken

[11] 4,370,947
[45] Feb. 1, 1983

[54] TROPICAL FISH EGG INCUBATOR

[76] Inventor: Mark A. Hilken, 709 E. 9th St., Spencer, Iowa 51301

[21] Appl. No.: 253,896

[22] Filed: Apr. 13, 1981

[51] Int. Cl.³ ............................................ A01K 61/00
[52] U.S. Cl. ..................................................... 119/3
[58] Field of Search .................................. 119/3, 2, 4

[56] References Cited

U.S. PATENT DOCUMENTS

| | | | |
|---|---|---|---|
| 1,023,590 | 4/1912 | Parry | 119/3 |
| 3,886,902 | 6/1975 | Haynes | 119/3 |
| 4,133,760 | 1/1979 | Ogawa | 119/3 |
| 4,183,322 | 1/1980 | Shultz et al. | 119/4 |
| 4,214,551 | 7/1980 | McNeil et al. | 119/3 |

Primary Examiner—Hugh R. Chamblee

Attorney, Agent, or Firm—Zarley, McKee, Thomte, Voorhees & Sease

[57] ABSTRACT

Tropical fish eggs are placed on a slate and fertilized and the slate is placed in an incubator in a water circulator which includes an air stone for drawing water across the eggs in the chamber containing the slate while air bubbles rise to the top in the adjacent chamber thereby maintaining a smooth, gentle water flow simulating water movement generated by the parent fish. When small fry begin to appear they are placed on a mesh screen above the bottom of the incubator and water inlet pipes on the bottom of the incubator draw water downwardly past the eggs and small fry and that water is then moved upwardly under air pressure injected into a vertical main pipe and fed back into the top of the incubator tank.

21 Claims, 5 Drawing Figures

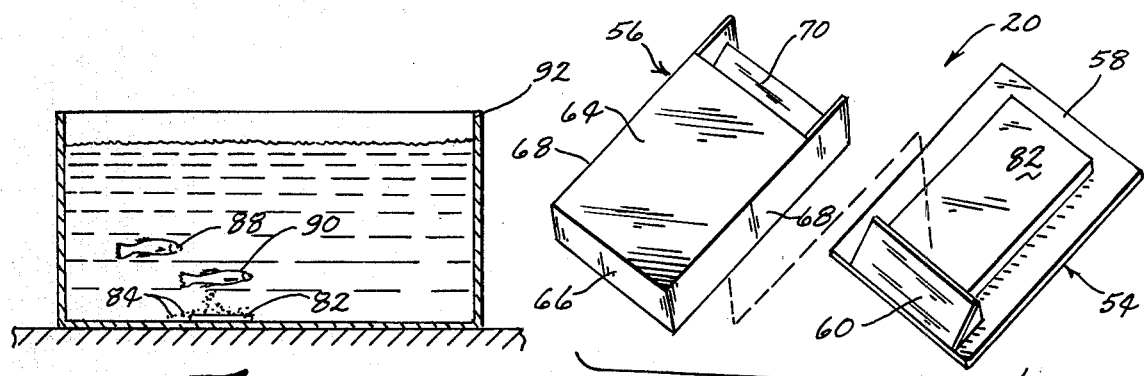
Fig. 1
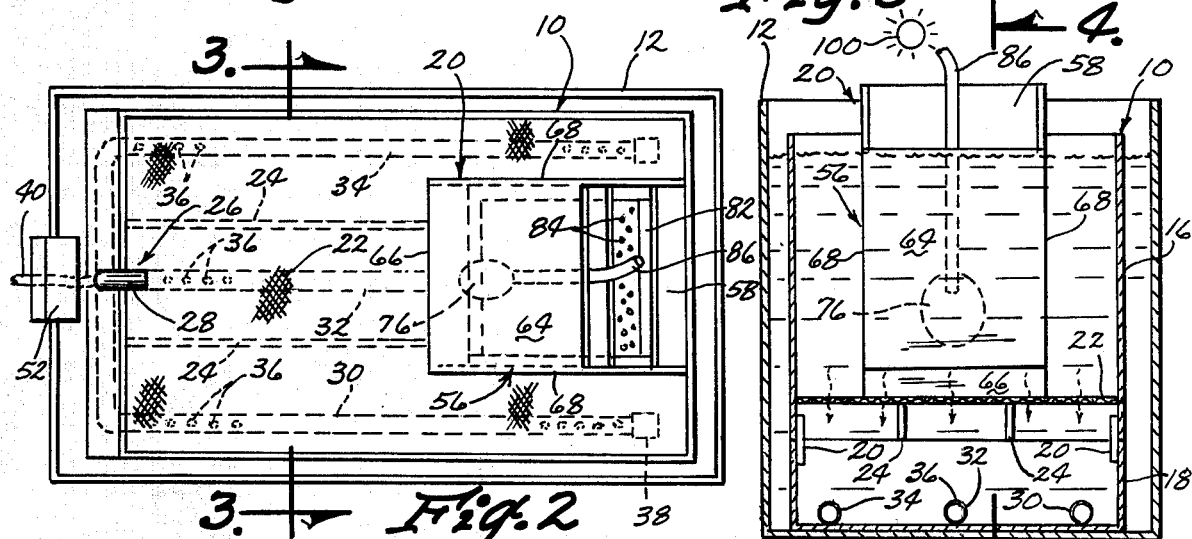
Fig. 2
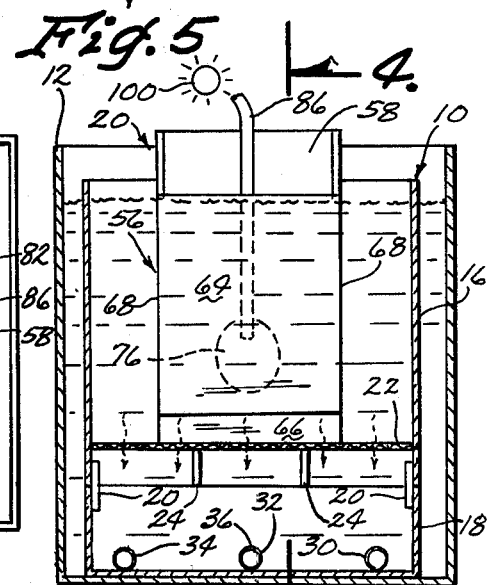
Fig. 5
Fig. 3
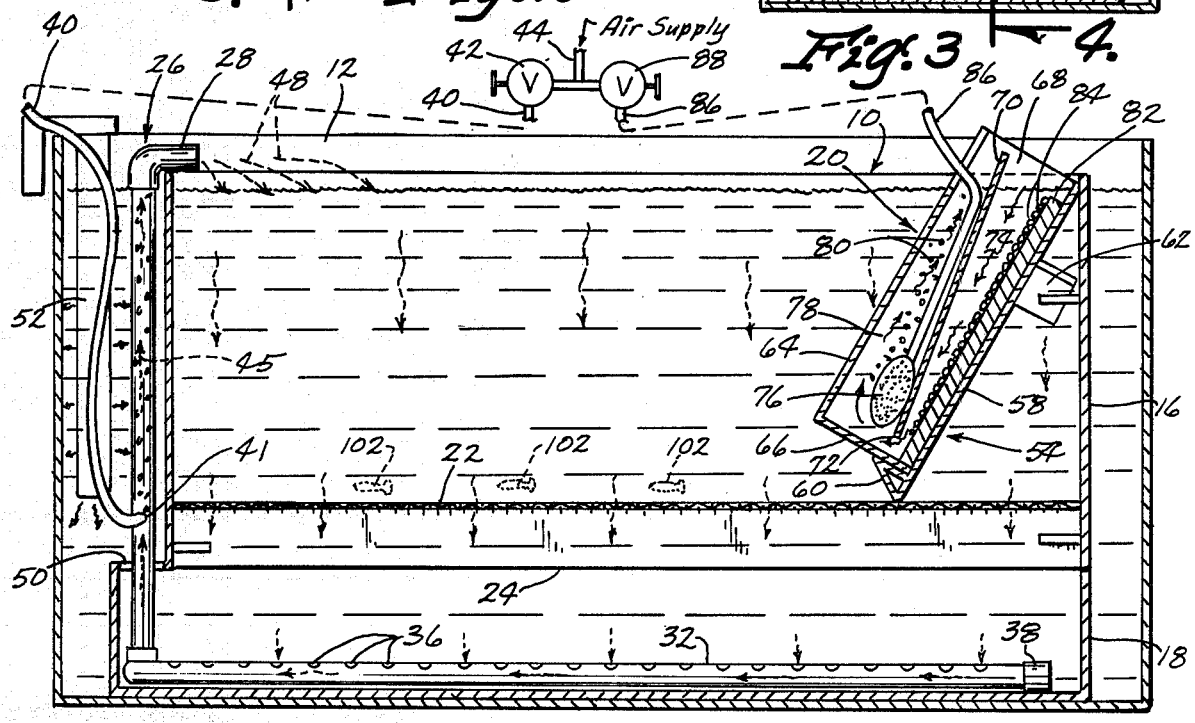
Fig. 4

TROPICAL FISH EGG INCUBATOR

BACKGROUND OF THE INVENTION

In the raising of tropical fish, procedures heretofore involved merely placing the eggs in a container containing an air stone which would produce a turbulent condition in the water around the eggs thus providing a deterrent to a successful incubation process. The eggs would often fall to the bottom of the container where stagnant water conditions would exist.

Ideally, the environment for the eggs and small fry should simulate that produced by the parents if left with the eggs wherein the parent fish swim back and forth over the eggs fanning them with their fins keeping dust from settling on the spawn. Leaving the parents with the eggs runs the risk that the parent fish will turn into in infanticidal cannibals if conditions aren't exactly to their liking. Thus, especially with exceptionally nervous or easily frightened parents it is usually best to remove the eggs so that they cannot be eaten.

Accordingly, an incubator is desired that is easily operated, cleaned and one which produces environmental conditions similar to those produced by parent fish when carrying for their eggs during the spawning process.

SUMMARY OF THE INVENTION

The tropical fish egg incubator of this invention basically involves three steps with the first being the placing of the eggs by the mother fish on a slate followed by fertilizing by the male fish whereupon the fertilized slate is placed in a water circulator located in the incubator tank. The water flowing past the eggs in the water circulator is smooth, gentle, quiet and air bubble free and continues until small fry begin to appear whereupon the remaining eggs and small fry are placed on a mesh screen in the incubator tank and water is again smoothly, quietly and air bubble free caused to move downwardly in the tank over the eggs and small fry thereby providing water circulation around all of the spawn and small fry thereby keeping dust from settling on the spawn and small fry. Any area where water is not free to move around the young becomes a likely spot for stagnation to take place and kill the young. With the fish egg incubator of this invention water is constantly circulated around the eggs and small fry. Experience using the incubator of this invention has produced results showing as high as 98% of the eggs survive to the point of being free swimming and at least 85% reach an age where survival on the outside of the incubator is necessary.

DESCRIPTION OF THE DRAWINGS

FIG. 1 is a side-elevational view of a spawning tank.

FIG. 2 is a top-plan view of the fish incubator tank in a larger tank.

FIG 3 is a cross-sectional view taken along line 3—3 in FIG. 2.

FIG. 4 is a cross-sectional view taken along line 4—4 in FIG. 3.

FIG. 5 is a exploded perspective view of the water circulator.

DESCRIPTION OF THE PREFERRED EMBODIMENT

The fish egg incubator of this invention is referred to generally in FIG. 2 by the reference numeral 10 and is shown positioned in a larger ten-gallon tank 12. The incubator 10 includes three basic assemblies. The incubator tank 14 includes the upper section 16 and a base section 18. The third assembly is the water circulator 20, best seen in FIGS. 4 and 5.

The upper tank section 14 includes side and end walls and an open bottom which when joined to the base unit 18 provides an enclosed tank. Side retainer strips 20 are provided on the sidewalls of the base unit 18 to hold the upper tank section 14 in alignment with the base unit 18 sidewalls. A nylon mesh screen 22 is strung across longitudinally extending frame members 24 running the length of the upper section 14.

The base section 18 includes a water circulation pipe system 26 which includes an outlet vertical main pipe 28 connected to feeder pipes 30, 32 and 34 on the bottom wall of the base unit 18. The feeder pipes include inlet openings 36 along their length and are closed at the outer ends by caps 38. An air hose 40 connected to a valve 42 in turn connected with an air supply source 44 is in communication with the vertical main pipe 28 at an opening 41 intermediate its ends. Air is directed upwardly as indicated by the arrows 45 in the main vertical pipe 28 and thus draws water into the feeder pipes through the openings 36 whereupon the water is exhausted back into the incubator 10 at the top as indicated by the arrows 48.

As previously indicated the incubator 10 is positioned in the larger preferably 10-gallon tank 12 and is in communication with the water in that tank through the connection of the top section 16 to the base section 18 and through an opening 50 in the base section 18 through which the main pipe 28 extends. The tank 12 also includes a water heater 52 for maintaining a constant temperature of 80° F.

The water circulator unit 20, as seen in FIGS. 4 and 5, includes two sections. The first section is the bottom half 54 and the second section is the top half 56. The bottom half 54 includes a wall 58 and a triangular support ledge 60 and a support brace 62. The top half 56 includes a front wall 64, end wall 66, and sidewalls 68. A diagonally extending dividing wall 70 runs the substantial length of the top half section 56 from the front wall 64 at the top to adjacent the back wall 58 at the bottom. The lower end 72 of the dividing wall 70 is spaced from the wall 66 and closely spaced to the wall 58 to increase the speed of water moving in chamber 74. An air stone 76 is provided in a chamber 78 and causes air bubbles 80 to rise in turn causing water to be drawn downwardly as indicated by the solid-line arrows in chamber 74.

An egg slate 82 carrying fertilized eggs 84 is placed against the bottom wall 58 and thus the water moving in chamber 74 over the eggs 84 simulates the wave action produced by the parent fish and is absent any turbulence caused by air bubbles seen in the chamber 78. The water moving across the eggs 84 is quiet, calm and gentle to the eggs 84 and is increased in speed by the narrowing of the cross-sectional area of the chamber at the lower end by the positioning of the dividing plate 70.

The air stone 76 includes an air line 86 in turn connected to a valve 88 connected to the air source 44. Thus, independent operation of the water system 26 and the water circulator 20 is possible.

Briefly, in operation, the male and female fish 88 and 90, respectively, in a tank 92 place the eggs 84 on the egg slate plate 82 and when fertilized the slate is removed and put into the water circulator 20. After the third day the top section 56 is removed exposing the egg slate 82 which is then removed and the eggs are shaked off onto the nylon mesh screen 22. Eggs are also removed from the back assembly 54 by shaking onto the screen 22. Now the water circulation system 26 is operated through operation of the valve 42. During the entire process lights 100 are left on thereby avoiding causing the fish to become frightened and packed together thus causing suffocation. With the eggs and small fry 102 on the screen 22 the valve 42 is opened causing air to be injected into the main pipe 28 which moves in an upward direction thereby drawing water into the feeder pipes 30, 32 and 34, which in turn moves the water downwardly as indicated by the dash-line arrows in FIG. 4 past the eggs and small fry 102 through the mesh screen 72. Water is returned to the incubator tank as indicated by the arrow 48. The valve 88 connected to the air stone 76 in the water circulator 20 would be in an off position since the water circulator is nonfunctional after the eggs and small fry have been removed to the mesh screen 22 of the incubator tank 12.

THE PROCESS OF EGG INCUBATION

When the parent fish are ready to spawn, the incubator should be prepared to receive the slate 82. The tank 12 is rinsed off to get rid of any stray dust or waste which might have fallen into it.

The aquarium tank 12 should be filled with preheated water at least twenty-four hours ahead of time and the heater 52 should be set at 80° F. When the parent fish 88 and 90 are within a couple of hours of laying eggs the slate 82 should be removed from the tank 10 and scrubbed down with hot water and then placed in the spawning tank 92 of FIG. 1. Once the act of spawning has begun, the parent fish should not be molested. After the female has quit laying eggs and the male is no longer fertilizing the eggs, the slate 82 should be removed from the tank 92 and put into the water circulator 20, as seen in FIG. 4. It is very critical that the air stone 76 be operating at full capacity and thus the valve 88 should be fully open. This will cause water to be pulled down across the eggs 84 and give no chance for air bubbles to damage the fragile eggs.

As soon as the slate of eggs is introduced into the tank 10, 70 drops of Methylene Blue should be added to the water inside the unit. The drops should be mixed with some water from the unit in a pint jar before adding it to the unit to make sure that there aren't any lumps of the Methylene Blue which may have settled in the bottle.

The following is the day-to-day routine which should be followed to insure proper incubating.

Day 1—Parents spawn. The fertile slate 82 is put into the prepared incubator 10. Add 70 drops of Methelyene Blue and maintain the water at 80° F. The eggs should be at the bottom of the slate.

Day 2—Remove one gallon of water from the incubator 10 and add fresh pre-heated water with 40 drops of Methelyene Blue being added to the fresh water before adding it to the tank 10. Remove any dead eggs from the slate 82 which might have appeared during the day. These eggs were missed by the male during the spawn period. To remove dead eggs from the slate 82, put an eye dropper glass on the end of a four foot length of plastic air tube and create a siphon action and pluck the dead eggs from the slate. Keeping a finger on the low end of the siphon will control the water flow. A nylon mesh 22 on the floor of the tank 10 should be cleaned with the siphon and it is very important that the bottom of the tank 10 be kept clean.

Day 3—Repeat Day #2 activity routine. It will be noticed that about 48 hours after the eggs have been spawned that tails appear protruding from the egg sack and this indicates it is a time of caution in removing any dead eggs from the slate, if any appear. What has happened is that the small fry have become attached to the slate only by a fragile cord connected to the head and they can be easily pulled off. Try to leave the small fry on the slate.

Day 4—Do regular cleaning of the bottom of the incubator tank 10 and change the water and continue to add 40 drops of Methelyene Blue as in previous days. Remove the top half section 56 from the water circulator 20 as would be done to remove any dead eggs from the slate 82 but this time pick up the slate and shake it back and forth until all the small fry 102 are free of the slate and have fallen onto the nylon mesh net 22 in the incubator tank 10. Also remove the bottom half section 54 and shake it back and forth as was done with the slate 82. This makes sure all the small fry 102 are released to the incubator tank 10. The water circulator half sections 54 and 56 are now removed from the tank and the air stone 76 is allowed to hang in the tank in a manner that will help to provide the best possible water circulation.

Day 5—Now that the small fry 102 are in the incubator tank 10 water should be added and removed from the system in the area inside the larger outside tank 12 outside of the incubator tank 10. It is now no longer possible to attempt to clean the bottom of the tank 10 and instead this should be delayed until the eighth day when the young are swimming. Light is very important in developing the small fry and should have been in use throughout the entire sequence from Day 1, as seen at 100 in FIG. 3. The light should be kept on 24 hours a day.

Day 6—Repeat Day 5 schedule.

Day 7—Repeat Day 5 schedule.

Day 8—It should be noticed that the young have managed to get away from the sticky cord which was still attached to their head and thus holding them to the bottom of the unit on the nylon screen 22. The small fry 102 will school together in search of food and feeding of them should now begin. They should be fed frozen baby brine shrimp three times a day, all they can eat. While the young are swimming around a siphon can be used to clean the net bottom and it is important to keep the bottom clean continuously.

Days 9-13—Repeat Day 8 schedule.

Day 14—Beginning with this day the amount of Methelyene Blue added to the fresh water during the change should be reduced by 10 drops each day. Otherwise, repeat Day 8 schedule. From here on, the young can be cared for more and more like adult fish and they should be kept in the incubator for another two weeks and the water should be changed as before but the Methelyene Blue should be omitted. The diet of the fish should continue to include baby brine shrimp. After about a month the young should be removed from the incubator 10 and put into a larger tank to grow and mature.

What is claimed is:

1. A fish egg incubator comprising, a water tank, an enclosure positioned upright in said water tank for a continuous exchange of water between said tank and said enclosure, said enclosure having an open top end and a closed lower end wall and front and back walls, a fish egg plate in said enclosure and on said back wall, said enclosure positioned in said tank with its open top end submerged in the water to provide fresh water into said other chamber to flow across said egg plate, a dividing wall in said enclosure extending lengthwise thereof to define oppositely disposed chambers interconnected at the lower of said enclosure by said dividing wall being spaced from the lower end wall, and an air stone in one of said chambers adjacent said front wall for causing water circulation downwardly in said other chamber across the egg plate and upwardly in said one chamber.

2. The structure of claim 1 wherein said chambers being interconnected at the lower end of said enclosure is further defined by said dividing wall extending diagonally from the front wall at the top end to the bottom wall at the lower end thereby providing said other chamber with a reduced cross-sectional area at its lower end for increasing the water flow speed across said egg plate.

3. The structure of claim 1 wherein said enclosure may be opened for access to said egg plate.

4. The structure of claim 3 wherein said enclosure includes two pieces, one of said pieces includes said back wall and the other piece includes said front wall and said dividing wall and said pieces may be disassembled to provide access to said egg plate.

5. The structure of claim 1 wherein said enclosure is disposed at angle to one vertical wall of said tank with the lower end spaced therefrom and the upper end abutting thereagainst.

6. The structure of claim 1 wherein said tank is positioned in a larger tank and water circulation means is provided to withdraw water from the bottom of the smaller tank and feed it into the smaller tank at its upper end thereby causing water flow from the top to the bottom in said smaller tank.

7. The structure of claim 6 wherein a mesh screen is provided above the bottom of said tank and supports said enclosure and small fry for circulation of calm water over said small fry.

8. The structure of claim 7 wherein said water circulation means includes a plurality of perforated pipes on the bottom of said tank connected to a main pipe having an outlet at the top of said tank and an air source is connected to said main pipe for directing air and water upwardly.

9. The structure of claim 8 wherein said air means and said air stone have separate independently operated controls.

10. A fish egg incubator comprising, a water tank having a mesh screen spaced above the bottom, a water pump connected to a plurality of water feeder pipes on the bottom for drawing water downwardly through said screen and said screen being adapted to receive fish eggs and small fry whereby the water movement thereby stipulates the wave action produced by parent fish swimming thereover and a water circulator in said tank and including a pair of upright chambers separated by a common dividing wall having an opening at the bottom thereof and a fish egg slate being positioned in an upright position in one of said chambers and an air stone being positioned in the other chamber for producing air bubbles which rise to the top of said other chamber and thereby causing water to flow smoothly and quietly without air bubbles or turbulence downwardly in said one chamber over and along said slate and through said opening into said other chamber.

11. The structure of claim 10 wherein said wall is oriented to decrease the cross-sectional area of said one chamber downwardly towards said opening whereby water speed is increased in said one chamber as it approaches said opening.

12. The structure of claim 11 wherein water from said tank is drawn into said one chamber at the top thereof and emptied from said other chamber into said tank at the top of said other chamber.

13. The structure of claim 12 wherein said water circulator includes two half sections with one section including a bottom wall supporting said slate and said other section includes a top wall and said common dividing wall and a lower end wall cooperating with the lower end of said common dividing wall to provide said opening connecting said adjacent chambers.

14. The structure of claim 13 wherein said water circulator is positioned in an inclined position on said screen and against one tank vertical side wall.

15. The structure of claim 10 wherein a pair of control valves are provided, one operatively connected to said pump means and the other operatively connected to said air stone for opening said pump means and air stone independently of each other.

16. The structure of claim 10 wherein said tank includes a top section and a bottom section with said top section having an open bottom and including said mesh screen and said bottom section having said feeder pipes and a bottom wall and each section including sidewalls cooperatively engaging each other to define a tank chamber.

17. The structure of claim 10 wherein said incubator is positioned in a larger water tank and means being provided for exchanging water from the incubator with water in the larger tank.

18. A process of incubating fish eggs comprising the steps of, placing the fertilized eggs in a water circulator on a surface, drawing water smoothly across said eggs without turbulence or air bubbles thereby simulating the fanning action of the parent fish swimming back and forth over the eggs by said surface being oriented in an upright posture and being in one of a pair of adjacent chambers with the other chamber including an air stone which produces air bubbles which rise to the top of the other chamber and draws water downwardly over said eggs and out of said one chamber and into said other chamber, and said one chamber having a cross-sectional area smaller at the bottom than at the top and being in communication with said other chamber at the bottom of each whereby the speed of the water is increased as it moves across said eggs.

19. The process of claim 18 wherein the step of placing the eggs in a water circulator includes placing the incubator in a larger water tank wherein water is drawn into said one chamber from said water tank and emptied into said tank from said other chamber thereby maintaining fresh water moving across said eggs.

20. The process of claim 18 wherein upon small fry beginning to appear in said eggs the eggs and small fry are placed on a mesh screen spaced above the bottom of the tank and smooth and quiet water is drawn downwardly in the tank through the screen and past the eggs and small fry.

21. The process of claim 20 wherein the step of drawing the water downwardly in the tank includes providing a plurality of feeder pipes on the bottom of the tank under the mesh screen and pumping the water out of the bottom of tank by injecting air in an upward direction in an upright outlet pipe connected to the feeder pipes.

* * * * *